United States Patent [19]

Himmrich et al.

[11] Patent Number: 5,387,359
[45] Date of Patent: Feb. 7, 1995

[54] ALKALINE EARTH METAL POTASSIUM ACETATE, A PROCESS FOR ITS PREPARATION AND ITS USE

[75] Inventors: Johannes Himmrich, Hürth; Günther Schimmel, Erftstadt; Klaus Pöllmannn, Burghausen, all of Germany

[73] Assignee: Hoechst Aktiengesellschaft, Frankfurt am Main, Germany

[21] Appl. No.: 161,777

[22] Filed: Dec. 2, 1993

[30] Foreign Application Priority Data

Dec. 17, 1992 [DE] Germany ............... 4242697

[51] Int. Cl.⁶ ............................. C09K 3/18
[52] U.S. Cl. ........................ 252/70; 252/71; 562/607
[58] Field of Search ............. 252/70, 71; 562/607; 106/13

[56] References Cited

U.S. PATENT DOCUMENTS

| | | | |
|---|---|---|---|
| 4,377,488 | 3/1983 | Gancy | 252/70 |
| 4,400,285 | 8/1983 | Gancy | 252/70 |
| 4,425,251 | 1/1984 | Gancy | 252/70 |
| 4,855,071 | 8/1989 | Todd, Jr. et al. | 252/70 |
| 5,219,483 | 6/1993 | Rynbrandt et al. | 252/70 |

FOREIGN PATENT DOCUMENTS 505746 7/1992 Germany ............... 562/607
WO88/05456 7/1988 WIPO .
WO92/17557 10/1992 WIPO .

*Primary Examiner*—Mark L. Bell
*Assistant Examiner*—C. M. Bonner
*Attorney, Agent, or Firm*—Connolly & Hutz

[57] ABSTRACT

The alkaline earth metal potassium acetate according to the invention comprises 14 to 19 % by weight of calcium ($Ca^{++}$),
0 to 1% by weight of magnesium ($Mg^{++}$),
11 to 16 % by weight of potassium ($K^+$),
62 to 71% by weight of acetate ($CH_3COO^-$),
0 to 7 % by weight of water and 0 to 2 % by weight of water-insoluble components For its preparation, a calcium oxide containing at least 85% of CaO, acetic acid and potassium hydroxide solution are reacted with one another and the reaction product is granulated to give particles of 0.5 to 5 mm. The alkaline earth metal potassium acetate according to the invention can be used as an environment-friendly deicing agent causing little corrosion.

2 Claims, No Drawings

ALKALINE EARTH METAL POTASSIUM ACETATE, A PROCESS FOR ITS PREPARATION AND ITS USE

The present invention relates to an alkaline earth metal potassium acetate, a process for its preparation and its use as a deicing agent.

Conventional deicing agents, such as alkali metal or alkaline earth metal chlorides, each have a high thawing power and thawing rate but cause severe corrosion to metal and concrete and are classed as environmentally polluting. In contrast, urea is scarcely corrosive but unfortunately has only a low thawing power and, owing to its high nitrogen content is regarded as being highly environmentally polluting. Alkali metal acetates have a high thawing power and cause only slight metal corrosion, but they corrode concrete through the exchange of calcium for alkali metal. Finally, alkaline earth metal acetates are well tolerated by metal and concrete but, owing to their slow dissolution rate, their thawing rate is low.

U.S. Pat. No. 4,855,071 discloses a process for the preparation of a deicing agent, in which a slurry is first prepared from alkaline earth metal or alkali metal bases or mixtures thereof and water. A carboxylic acid having 1 to 4 carbon atoms is introduced into the slurry in an amount which is sufficient for complete neutralization of the bases, and water is introduced into said slurry in an amount such that the resulting slurry comprising alkaline earth metal or alkali metal carboxylates or mixtures thereof is liquid and pumpable. The carboxylate slurry heated to temperatures of about 40° to 120° C. is distributed in a thin layer on substrate particles and the coated substrate particles are finally dried.

It is the object of the present invention to provide a substance and a process for its preparation, which substance is suitable as a deicing agent having good thawing power and a high thawing rate and in addition is environmentally friendly and causes little corrosion to metal and concrete.

The substance according to the invention is an alkaline earth metal potassium acetate having the following analysis:

14 to 19% by weight of calcium (Ca++),
0 to 1% by weight of magnesium (Mg++),
11 to 16% by weight of potassium (K+),
62 to 71% by weight of acetate (CH$_3$COO$^-$),
0 to 7% by weight of water
and
0 to 2% by weight of water-insoluble components.

The alkaline earth metal potassium acetate according to the invention exhibits the following X-ray diffraction pattern:

| d/Å | Intensity | d/Å | Intensity |
|---|---|---|---|
| 13.95 +− 0.30 | mw | 3.33 +− 0.04 | vs |
| 11.45 +− 0.30 | ms | 3.26 +− 0.04 | vs |
| 10.88 +− 0.30 | vs | 3.21 +− 0.04 | m |
| 7.13 +− 0.10 | w | 3.05 +− 0.03 | m |
| 6.65 +− 0.10 | w | 2.83 +− 0.03 | mw |
| 5.68 +− 0.08 | mw | 2.75 +− 0.03 | mw |
| 5.56 +− 0.08 | mw | 2.42 +− 0.02 | s |
| 4.22 +− 0.06 | w | 2.17 +− 0.02 | mw |
| 4.02 +− 0.06 | w | 2.05 +− 0.02 | mw |
| 3.57 +− 0.04 | m | | | vs = very strong
s = strong
ms = medium-strong
m = medium
mw = medium-weak
w = weak Furthermore, up to 50% by weight of alkaline earth metal and/or alkali metal carboxylates having 1 to 4 carbon atoms may be admixed with the alkaline earth metal potassium acetate according to the invention.

The alkaline earth metal potassium acetate according to the invention can be prepared by reacting a calcium oxide containing at least 85% by weight of CaO, acetic acid and potassium hydroxide solution with one another and granulating the reaction product with particles of 0.5 to 5 mm, preferably 1.5 to 2.5 mm.

The process for the preparation of the alkaline earth metal potassium acetate according to the invention may furthermore alternatively be designed in such a way that a) solid calcium oxide is reacted with excess acetic acid with kneading and the reaction product containing acetic acid is further kneaded after the addition of potassium hydroxide solution;
b) solid calcium oxide is reacted with partly neutralized acetic acid with kneading;
c) a slurry obtained from calcium oxide and water is reacted with acetic acid and potassium hydroxide solution while stirring;
d) a slurry obtained from calcium oxide and water is reacted with partly neutralized acetic acid while stirring;
e) the partly neutralized acetic acid is obtained from potassium hydroxide solution and acetic acid;
f) the partly neutralized acetic acid is obtained from potassium carbonate and acetic acid;
g) acetic acid containing at least 98% by weight of CH$_3$COOH is used;
h) potassium hydroxide solution containing at least 40% by weight of KOH is used;
i) the solution or suspension present after the reaction is dried in a spray dryer with hot air at 150° to 400° C.;
j) the solution or suspension present after the reaction is dried with the aid of a fluidized-bed dryer with simultaneous granulation.

Finally, the alkaline earth metal potassium acetate according to the invention can be used as an environmentally friendly deicing agent causing little corrosion, it furthermore being possible for up to 50% by weight of alkaline earth metal and/or alkali metal carboxylates having 1 to 4 carbon atoms to be admixed with the alkaline earth metal potassium acetate.

The alkaline earth metal potassium acetate according to the invention has a substantially higher dissolution rate than alkaline earth metal acetates or mixtures of alkaline earth metal acetates with alkali metal acetates and is thus distinguished by a higher thawing rate when used as a deicing agent.

In the process for the preparation of alkaline earth metal potassium acetate according to the invention, a pulverulent product is obtained in the course of the kneading reaction, while a solution or suspension is obtained in the reaction of the slurry obtained from calcium oxide and water with acetic acid and potassium hydroxide solution, from which solution or suspension a pulverulent product is obtainable by crystallization or spray-drying.

In the process for the preparation of the alkaline earth metal potassium acetate according to the invention, the granulation of the pulverulent product can be carried out with small amounts of water on a turntable or by compression granulation with the aid of a roll compactor. Finally, it is possible for the solution or suspension obtained in the reaction of the slurry obtained from calcium oxide and water with acetic acid and potassium hydroxide solution to be subjected to spray granulation (drying of the aqueous solution or suspension with simultaneous granulation with the aid of a fluidized-bed dryer). d

EXAMPLE 1

In a 1 l tilting kneader having Z kneading blades (from Aachener Misch- und Knetmaschinenfabrik Peter Küpper GmbH & Co. KG), 561 g of 99.5% strength acetic acid (9.30 mol) were added to 188 g of fine white lime about 89.3% of CaO, 2.99 mol of CaO) while kneading in a period of 25 minutes, and thoroughly kneaded for 90 minutes. Thereafter, 378 g of 45% strength potassium hydroxide solution (3.03 mol) were added to the reaction product containing acetic acid, and kneading was continued for a further hours after heating to about 70° C. According to its X-ray diffraction pattern, the resulting substance comprised essentially the alkaline earth metal potassium acetate according to the invention, its 10% strength aqueous solution had a pH of 9.0 and its water-insoluble residue amounted to 2% by weight.

EXAMPLE 2

In the kneader used in Example 1, 465 g of 99.5% strength acetic acid (7.70 mol) were added to 180 g of fine white lime (about 89.3% of CaO, 2.87 mol of CaO) while kneading in a period of 20 minutes, and thoroughly kneaded for 90 minutes. Thereafter, 178 g of 45% strength potassium hydroxide solution (1.43 mol) were added to the reaction product containing acetic acid, and kneading was continued for a further 6 hours after heating to about 70° C. The resulting material consisted of 17.5% by weight of calcium, 0.5% by weight of magnesium, 8.7% by weight of potassium, 67.3% by weight of acetate, 4.0% by weight of water and 2.0% by weight of water-insoluble residue. According to its X-ray diffraction pattern, the material contained the alkaline earth metal potassium acetate according to the invention as the main component and calcium acetate as a secondary component and the pH of its 10% strength aqueous suspension was 8.8.

EXAMPLE 3

In the kneader used in Example 1, 548 g of 99.5% strength acetic acid (9.08 mol) and 565 g of 45% strength potassium hydroxide solution (4.53 mol) were added to 138 g of fine white lime (about 89.3% of CaO, 2.20 mol of CaO) while kneading, the acetic acid and the potassium hydroxide solution being added alternately in portions of in each case of maximum of 100 g, and kneading being carried out for 30 minutes between each two additions. Finally, kneading was continued for a further 8 hours after heating to about 70° C.

The resulting material consisted of 10.9% by weight of calcium, 0.3% by weight of magnesium, 19.6% by weight of potassium, 63.2% by weight of acetate, 4.0% by weight of water and 2.0% by weight of water-insoluble residue. According to its X-ray diffraction pattern, the material contained the alkaline earth metal potassium acetate according to the invention as the main component and a substance which could not be characterized with certainty, probably potassium acetate, as a secondary component. The pH of the 10% strength aqueous suspension of the material was 8.6.

EXAMPLE 4

In a beaker, 561 g of 99.5% strength acetic acid (9.30 mol) were first partly neutralized with 378 g of 45% strength potassium hydroxide solution (3.03 mol). This partly neutralized acetic acid was added while kneading in a period of 40 minutes to 188 g of fine white lime (about 89.3% of CaO, 2.99 mol) which was present in the kneader used in Example 1, and kneading was then continued for 8 hours after heating to about 70° C. According to its X-ray investigation, the resulting material comprised predominantly the alkaline earth metal potassium acetate according to the invention and smaller amounts of calcium acetate and a substance which could not be characterized with certainty, probably potassium acetate. 2% by weight of the material were water-insoluble and its 10% strength aqueous suspension had a pH of 9.0.

EXAMPLE 5

In a beaker, 210 g of potassium carbonate (1.52 mol) were first added to 561 g of 99.5% strength acetic acid (9.30 mol) and stirring was carried out until no further $CO_2$ evolution was observed. Thereafter, water was added to the still cloudy reaction mixture while stirring, until a clear solution formed. The partly neutralized acetic acid prepared in this manner was reacted with 188 g of fine white lime (about 89.3% of CaO; 2.99 mol) with kneading in the kneader used in Example 1. According to its X-ray diffraction pattern, the resulting material corresponded to that from Example 4; its water-insoluble component amounted to about 2% by weight and its 10% strength aqueous suspension had a pH of 9.0.

EXAMPLE 6

In a beaker, an approximately 9% strength milk of lime was prepared from 180 g of fine white lime (about 89.3% of CaO, 2.87 mol of CaO) and 1710 g of water. This milk of lime was mixed with 266 g of 45% strength potassium hydroxide solution (2.13 mol) and neutralized with 474 g of 99.5% strength acetic acid (7.85 mol) in a period of 180 minutes while stirring. Thereafter, the approximately 25% strength alkaline earth metal potassium acetate solution prepared in this manner was filtered and was spray-dried with the aid of a laboratory spray tower (type 190 from Büchi) with hot air at 200° to 300° C. According to its X-ray investigation, the resulting material contained the alkaline earth metal potassium acetate according to the invention as the main component, while calcium acetate and a substance which could not be characterized with certainty, probably potassium acetate, were secondary components. The material was completely soluble in water and its 10% strength aqueous solution had a pH of 8.3.

We claim:
1. An alkaline earth metal potassium acetate, consisting essentially of
    14 to 19% by weight of calcium ($Ca^{++}$),

0 to 1% by weight of magnesium ($Mg^{++}$),
11 to 16% by weight of potassium ($K^+$),
62 to 71% by weight of acetate ($CH_3COO^-$),
0 to 7% by weight of water;
said alkaline earth metal potassium acetate having the following X-ray diffraction pattern:

| d/A | Intensity | d/A | Intensity |
|---|---|---|---|
| 13.95 +− 0.03 | mw | 3.33 +− 0.04 | vs |
| 11.45 +− 0.30 | ms | 3.26 +− 0.04 | vs |
| 10.88 +− 0.30 | vs | 3.21 +− 0.04 | m |
| 7.13 +− 0.10 | w | 3.05 +− 0.03 | m |
| 6.65 +− 0.10 | w | 2.83 +− 0.03 | mw |
| 5.68 +− 0.08 | mw | 2.75 +− 0.03 | mw |
| 5.56 +− 0.08 | mw | 2.42 +− 0.02 | s |
| 4.22 +− 0.06 | w | 2.17 +− 0.02 | mw |
| 4.02 +− 0.06 | w | 2.05 +− 0.02 | mw |
| 3.57 +− 0.04 | m | | | vs = very strong
s = strong
ms = medium-strong
m = medium
mw = medium-weak
w = weak.

2. A deicing agent causing little corrosion comprising a mixture of a) up to 50% by weight of carboxylates having 1 to 4 carbon atoms with cations selected from alkali metals and alkaline earth metals, and
b) an alkaline earth metal potassium acetate consisting essentially of
14 to 19% by weight of calcium ($Ca^{++}$),
0 to 1% by weight of magnesium ($Mg^{++}$),
11 to 16% by weight of potassium ($K^+$),
62 to 71% by weight of acetate ($CH_3COO^-$),
0 to 7% by weight of water;
said alkaline earth metal potassium acetate having the following X-ray diffraction pattern:

| d/A | Intensity | d/A | Intensity |
|---|---|---|---|
| 13.95 +− 0.03 | mw | 3.33 +− 0.04 | vs |
| 11.45 +− 0.30 | ms | 3.26 +− 0.04 | vs |
| 10.88 +− 0.30 | vs | 3.21 +− 0.04 | m |
| 7.13 +− 0.10 | w | 3.05 +− 0.03 | m |
| 6.65 +− 0.10 | w | 2.83 +− 0.03 | mw |
| 5.68 +− 0.08 | mw | 2.75 +− 0.03 | mw |
| 5.56 +− 0.08 | mw | 2.42 +− 0.02 | s |
| 4.22 +− 0.06 | w | 2.17 +− 0.02 | mw |
| 4.02 +− 0.06 | w | 2.05 +− 0.02 | mw |
| 3.57 +− 0.04 | m | | | vs = very strong
s = strong
ms = medium-strong
m = medium
mw = medium-weak
w = weak.

* * * * *